United States Patent [19]

Harada et al.

[11] Patent Number: 5,197,072
[45] Date of Patent: Mar. 23, 1993

[54] OPTICAL WAVELENGTH CONVERTING DEVICE, AND LASER DIODE PUMPED SOLID LASER

[75] Inventors: Akinori Harada; Nobuharu Nozaki; Yoji Okazaki; Horoaki Hyuga, all of Kanagawa, Japan

[73] Assignee: Fuji Photo Film Co., Ltd., Kanagawa, Japan

[21] Appl. No.: 714,530

[22] Filed: Jun. 13, 1991

[30] Foreign Application Priority Data

Jun. 13, 1990 [JP] Japan .................... 2-154475
Aug. 6, 1990 [JP] Japan .................... 2-208744

[51] Int. Cl.$^5$ .................................... H01S 3/10
[52] U.S. Cl. ........................ 372/21; 372/22; 359/328; 385/142
[58] Field of Search ............ 372/21, 22; 359/326, 359/328; 385/142

[56] References Cited

U.S. PATENT DOCUMENTS

| | | | |
|---|---|---|---|
| 4,731,787 | 3/1988 | Fan et al. ............... | 372/22 |
| 4,739,507 | 4/1988 | Byer et al. .............. | 372/22 |
| 4,893,888 | 1/1990 | Okazaki et al. ......... | 359/328 |
| 4,909,595 | 3/1990 | Okazaki et al. . | |
| 4,923,277 | 5/1990 | Okazaki et al. . | |
| 4,952,013 | 8/1990 | Harada et al. .......... | 359/328 |
| 4,982,112 | 1/1991 | Okazaki et al. . | |
| 5,027,361 | 6/1991 | Kozlovsky et al. ..... | 359/328 |
| 5,038,352 | 8/1991 | Lenth et al. ............ | 359/326 |
| 5,080,507 | 1/1992 | Harada et al. .......... | 359/328 |

FOREIGN PATENT DOCUMENTS 60-250334 12/1985 Japan .
62-189783 8/1987 Japan .
64-23232 1/1989 Japan .

OTHER PUBLICATIONS

U.S. patent application Ser. No. 07/406,018 to Okazaki et al. filed Sep. 12, 1989.

*Primary Examiner*—Léon Scott, Jr.
*Attorney, Agent, or Firm*—Sughrue, Mion, Zinn, Macpeak & Seas

[57] ABSTRACT

An optical wavelength converting device comprises an optical waveguide device. The optical waveguide device is provided with a waveguide, which is constituted of a solid laser medium doped with a rare earth metal and a nonlinear optical material for converting a wavelength. The solid laser medium and said nonlinear optical material are overlaid one upon the other. A cladding is formed of a material having a lower refractive index than the waveguide and accommodates the waveguide therein. Two edge faces of the optical waveguide device serve as a resonator for a laser beam, which has been produced by the solid laser medium.

10 Claims, 3 Drawing Sheets

OPTICAL WAVELENGTH CONVERTING DEVICE, AND LASER DIODE PUMPED SOLID LASER

BACKGROUND OF THE INVENTION

1. Field of the Invention

This invention relates to an optical wavelength converting device, which is of the optical waveguide type, and more particularly to an optical wavelength converting device, which comprises an waveguide means constituted of a solid laser medium and a nonlinear optical material overlaid one upon the other. This invention also relates to a laser diode pumped solid laser, in which a solid laser medium is pumped by a semiconductor laser (or a laser diode), and more particularly to a laser diode pumped solid laser, wherein its solid laser medium has a function for converting a wavelength such that a laser beam, which has been obtained from solid laser oscillation, may be converted into its second harmonic, or the laser beam, which has been obtained from solid laser oscillation, and a different laser beam may be converted into a wave having a frequency equal to the sum of or the difference between the frequencies of the two laser beams.

2. Description of the Prior Art

Laser diode pumped solid lasers have been proposed in, for example, Japanese Unexamined Patent Publication No. 62(1987)-189783. The proposed laser diode pumped solid lasers comprise a solid laser rod, which has been doped with a rare earth metal, such as neodymium (Nd). The solid laser rod is pumped by a semiconductor laser.

In the laser diode pumped solid laser of this type, in order for a laser beam having as short a wavelength as possible to be obtained, a bulk single crystal of a nonlinear optical material for converting the wavelength of a laser beam, which has been produced by solid laser oscillation, is located in a resonator of the solid laser. The laser beam, which has been produced by the solid laser oscillation, is thereby converted into its second harmonic, or the like. An example of such a laser diode pumped solid laser having the function for converting a wavelength is disclosed in U.S. Pat. application Ser. No. 406,018.

As disclosed in U.S. patent application Ser. No. 406,018, in the laser diode pumped solid laser of the aforesaid type, for example, an organic material is utilized as the nonlinear optical material such that the efficiency, with which the wavelength conversion is effected, may be kept high. However, with the conventional laser diode pumped solid laser of the aforesaid type, the efficiency, with which the wavelength conversion is effected, cannot be kept sufficiently high. Thus there is a strong demand for laser diode pumped solid lasers which are capable of converting wavelengths of laser beams with a sufficiently high efficiency.

Also, the techniques for locating a bulk single crystal of a nonlinear optical material in a resonator of a solid laser have the drawback in that considerable time and labor are required to align the optical axis of a solid laser rod and the optical axis of the bulk single crystal with each other. Additionally, the solid laser rod and the bulk single crystal are formed as different independent parts, and therefore the solid laser cannot be kept small in size. Moreover, there is the risk that error occurs in aligning the optical axis of the solid laser rod and the optical axis of the bulk single crystal with each other. Therefore, the reliability and mode stability of the solid laser cannot be kept good.

SUMMARY OF THE INVENTION

The primary object of the present invention is to provide an optical wavelength converting device, which efficiently converts the wavelength of a laser beam produced by a solid laser medium.

Another object of the present invention is to provide an optical wavelength converting device, which is small in size and has good reliability and stability.

A further object of the present invention is to provide a laser diode pumped solid laser, which has a high wavelength conversion efficiency and a high energy utilization efficiency.

A still further object of the present invention is to provide a laser diode pumped solid laser, wherein laser oscillation is effected at a small threshold value.

The optical wavelength converting device in accordance with the present invention takes on the form of an optical waveguide device (a two-dimensional optical waveguide device, a three-dimensional optical waveguide device, or an optical fiber device) comprising a waveguide means and a cladding means, in which the waveguide means is accommodated.

Specifically, the present invention provides an optical wavelength converting device, which comprises an optical waveguide device provided with:

i) a waveguide means, which is constituted of a solid laser medium doped with a rare earth metal and a nonlinear optical material for converting a wavelength, said solid laser medium and said nonlinear optical material being overlaid one upon the other, and ii) a cladding means, which is formed of a material having a lower refractive index than said waveguide means and which accommodates said waveguide means therein, wherein two edge faces of said optical waveguide device serve as a resonator for a laser beam, which has been produced by said solid laser medium.

With the optical wavelength converting device in accordance with the present invention, a laser beam, which has been produced by, for example, a semiconductor laser and which serves as a pumping beam, is introduced into the waveguide means. As a result, the solid laser medium produces a laser beam. Laser oscillation is caused to occur by the resonator, which is constituted of the two edge faces of the optical waveguide device. The laser beam, which has been produced by the solid laser oscillation, has an intensity distribution extending to the exterior of the solid laser medium, i.e. to the nonlinear optical material overlaid on the solid laser medium. The laser beam, which travels in the nonlinear optical material, is converted into, for example, its second harmonic by the nonlinear optical material.

The nonlinear optical material may be selected from organic nonlinear optical materials. One example of the organic nonlinear optical materials is 2-methyl-4-nitroaniline (MNA), as disclosed in Japanese Unexamined Patent Publication No. 60(1985)-250334. Examples of the organic nonlinear optical materials also include N-(4-nitrophenyl)-L-prolinol (NPP), N-(4-nitrophenyl)-N-methylaminoacetonitrile (NPAN), MAP, and metanitroaniline (m-NA), as described in J. Opt. Soc. Am. B. The organic nonlinear optical materials, such as MNA and NPP, have markedly larger nonlinear optical constants than inorganic nonlinear optical materials, such as LiNbO$_3$ and KTP, and therefore can achieve a high wavelength conversion efficiency. Also, the organic nonlinear optical materials are advantageous over the inorganic nonlinear optical materials in that the threshold value for dielectric breakage is large and optical damage is small.

Also, as the organic nonlinear optical material, 3,5-dimethyl-1-(4-nitrophenyl)pyrazole (DMNP) represented by the molecular formula

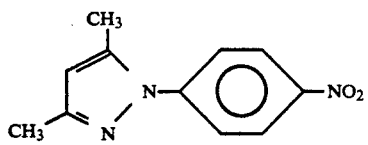

is particularly preferable. DMNP has a markedly large nonlinear optical constant. DMNP is disclosed in U.S. patent application Ser. No. 263,977.

The optical wavelength converting device in accordance with the present invention takes on the form of the optical waveguide device provided with waveguide means, which is constituted of the solid laser medium and the nonlinear optical material overlaid one upon the other. Therefore, with the optical wavelength converting device in accordance with the present invention, the length, over which the nonlinear optical material and the fundamental wave (the laser beam) interact with each other, can be kept sufficiently long. Also, the power density of the fundamental wave can be kept sufficiently high. Accordingly, a high wavelength conversion efficiency can be obtained.

Also, the optical wavelength converting device in accordance with the present invention, which takes on the form of the optical waveguide device, can be kept smaller in size than conventional optical wavelength converting devices composed of a bulk single crystal of a nonlinear optical material and a solid laser rod. Additionally, with the optical wavelength converting device in accordance with the present invention, no adjustment is required for alignment of optical axes, and there is no risk that error occurs in alignment of optical axes. Therefore, the optical wavelength converting device in accordance with the present invention has good reliability and stability.

The laser diode pumped solid laser in accordance with the present invention takes on the form of an optical waveguide device.

Specifically, the present invention also provides a laser diode pumped solid laser comprising:

i) a waveguide means constituted of a solid laser medium, which has been doped with a rare earth metal and which has a function for converting a wavelength, ii) a cladding means, which is formed of a material having a lower refractive index than said waveguide means, and iii) resonator mirrors formed on two edge faces of said waveguide means such that a laser beam, which has been produced by said solid laser medium when said solid laser medium is pumped by a semiconductor laser beam d incident upon said waveguide means, may oscillate between said resonator mirrors, whereby a wavelength-converted wave is obtained from the laser beam, which has been obtained from the oscillation.

With the laser diode pumped solid laser in accordance with the present invention, by way of example, the laser beam, which has been obtained from the oscillation, may be converted into its second harmonic. Alternatively, the semiconductor laser beam and the laser beam, which has been obtained from the oscillation, may be converted into a wave having a frequency equal to the sum of or the difference between the frequencies of the two laser beam.

The solid laser medium of the laser diode pumped solid laser in accordance with the present invention may be constituted of a material selected from the so-called self-frequency-doubling crystals. Examples of the self-frequency-doubling crystals include NYAB [i.e., Nd$_x$Y$_{1-Y}$Al$_3$(BO$_3$)$_4$, X=0.04 to 0.08], Nd:MgO:LiNbO$_3$, Nd:PNP, and Tm:LiNbO3. Alternatively, the solid laser medium of the laser diode pumped solid laser in accordance with the present invention may be constituted of an inorganic material, such as KTP, $\beta$-BBO, LiB$_2$O$_3$, KNbO$_3$, or a nonlinear optical material which comprises a chalcopyrite semiconductor doped with a rare earth metal, such as Nd, and which is capable of converting a wavelength. Particularly, KTP has a large nonlinear optical constant, a wide temperature tolerance range, and a wide angle tolerance range, and therefore can achieve a high wavelength conversion efficiency.

As another alternative, the solid laser medium of the laser diode pumped solid laser in accordance with the present invention may be constituted of an organic nonlinear optical material, such as NPP, NPAN, or DMNP, which has been doped with a rare earth metal. One typical example of such organic nonlinear optical material doped with a rare earth metal is Nd:PNP. Particularly, DMNP has a larger nonlinear optical constant than KTP and a wide temperature tolerance range, and therefore can achieve a high wavelength conversion efficiency.

The laser diode pumped solid laser in accordance with the present invention may take on the form of a fiber type of device, a three-dimensional optical waveguide device, or a two-dimensional optical waveguide device.

The laser diode pumped solid laser in accordance with the present invention takes on the form of an optical waveguide device (or a fiber type of device). Therefore, with the laser diode pumped solid laser in accordance with the present invention, the number of parts can be kept small. Also, it is only necessary that two faces be processed (or machined), ground, and coated. Additionally, only a single medium for absorbing the laser beam, which has been obtained from the solid laser oscillation, may be used. Accordingly, internal loss, which occurs in the resonator due to absorption by the parts, can be kept very small. As a result, the internal power of the laser beam, which has been obtained from the solid laser oscillation, can be kept high, and the wavelength conversion efficiency can be kept markedly high.

Also, with the laser diode pumped solid laser in accordance with the present invention, which takes on the form of an optical waveguide device, the power densities of the semiconductor laser beam, which serves as a pumping beam, and the laser beam, which has been obtained from the solid laser oscillation and which serves as a fundamental wave, can be kept sufficiently high. This feature also contributes to an improvement in the wavelength conversion efficiency and enables the solid laser oscillation at a small threshold value.

Additionally, the laser diode pumped solid laser in accordance with the present invention can be kept small in size, and can achieve a high efficiency, with which energy is utilized.

DESCRIPTION OF THE PREFERRED EMBODIMENTS

The present invention will hereinbelow be described in further detail with reference to the accompanying drawings.

Figure 1:
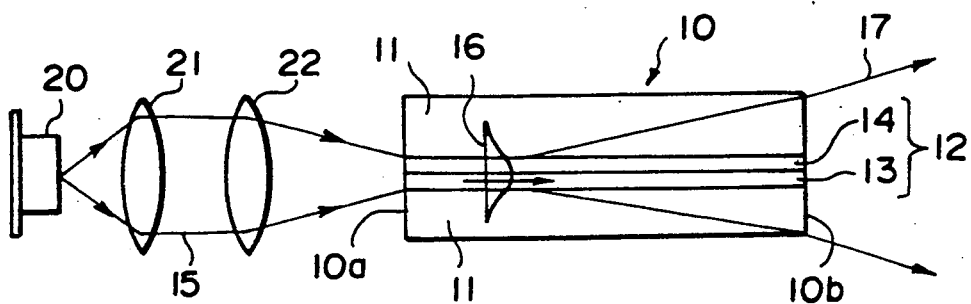
FIG. 1 is a schematic side view showing an embodiment of the optical wavelength converting device in accordance with the present invention.

FIG. 1 is a schematic side view showing an embodiment of the optical wavelength converting device in accordance with the present invention. This embodiment takes on the form of a two-dimensional optical waveguide device 10. The two-dimensional optical waveguide device 10 comprises two single crystal substrates 11, 11, which serve as a cladding means, and an optical waveguide 12, which is located between the two BRIEF single crystal substrates 11, 11. The optical waveguide 12 is constituted of YGG layer 13, which has been doped with neodymium (Nd) (the Nd-doped YGG layer will hereinafter be referred to as the Nd:YGG layer), and a DMNP layer 14, which is overlaid upon the Nd:YGG layer 13.

Figure 2:
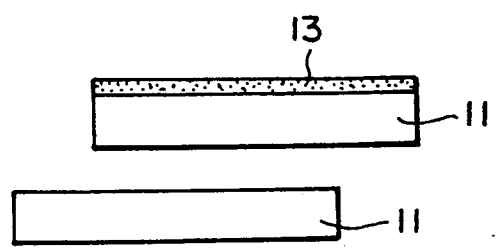
FIGS. 2 and 3 are explanatory views showing how the embodiment of the optical wavelength converting device in accordance with the present invention is made.
Figure 3:
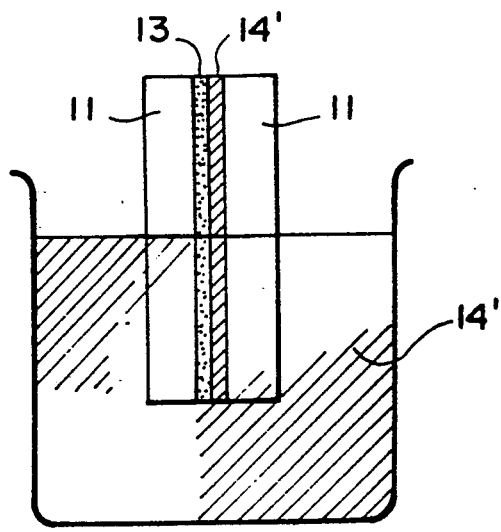

By way of example, the optical waveguide device 10 may be made in the manner described below. As shown in FIG. 2, two BRIEF single crystal substrates 11, 11 are prepared. The Nd:YGG layer 13 having a thickness of approximately 1 μm is then formed by a sputtering process, or the like, on one surface of a BRIEF single crystal substrate 11. Thereafter, as shown in FIG. 3, the substrates 11, 11 are located close to each other with the Nd:YGG layer 13 intervening therebetween. DMNP 14′ is kept in a melt condition in a furnace, or the like, and the lower portions of the substrates 11, 11 are dipped in the molten DMNP 14′. As a result, the molten DMNP 14′ enters the small gap formed between the substrates 11, 11 by capillary action. In order for the molten DMNP 14′ to be prevented from decomposing, the temperature of the molten DMNP 14′ is kept at a valve slightly higher than its melting point (102° C.).

Thereafter, the substrates 11, 11 are quenched. As a result, the DMNP 14′, which has entered into the small gap between the substrates 11, 11 is converted into a polycrystalline state. The substrates 11, 11 are then gradually drawn from the furnace, the temperature of which is kept at a value (e.g. 102.5° C.) higher than the melting point of the DMNP 14′, to the exterior kept at a temperature lower than said melting point. The molten DMNP 14′ is thereby converted into the single crystal state at the point, at which the substrates 11, 11 are drawn out to the exterior of the furnace. In this manner, the DMNP layer 14 is formed in a markedly long single crystal state and in uniform crystal orientation. Therefore, a sufficiently long optical waveguide 12 can be obtained.

Refractive indexes of the BRIEF single crystal substrates 11, 11, the Nd:YGG layer 13, and the DMNP layer 14 with respect to a wavelength of 1064 nm are 1.80, 1.92, and 1.82, respectively.

One edge face 10a (a light input edge face) of the optical waveguide device 10 is coated with a film, which transmits a pumping beam 15 having a wavelength of $\lambda 1 = 810$ nm and which reflects a laser beam 16 having a wavelength of $\lambda 2 = 1,064$ nm and a second harmonic 17 having a wavelength of $\lambda 3 = 532$ nm. The other edge face 10b (a light output edge face) of the optical waveguide device 10 is coated with a film, which reflects the pumping beam 15 and the laser beam 16 and which transmits the second harmonic 17.

A semiconductor laser 20 serves as a source of the pumping beam 15. The semiconductor laser 20 is constituted of a phased array laser, which produces the laser beam 15 (the pumping beam) having a wavelength of $\lambda 1 = 810$ nm. The pumping beam 15, which is divergent, is collimated by a collimator lens 21. The collimated pumping beam 15 is condensed by a condensing lens 22 and impinges upon the edge face of the optical waveguide 12, which edge face is located in the edge face 10a of the optical waveguide device 10. The pumping beam 15 enters the Nd:YGG layer 13. The Nd atoms in the Nd:YGG layer 13 are stimulated by the pumping beam 15 and produce the laser beam 16 having a wavelength of $\lambda 2 = 1,064$ nm. Because the edge faces 10a and 10b of the optical waveguide device 10 are coated with the aforesaid films, the laser beam 16 is confined between the edge faces 10a and 10b, which serve as a resonator. In this manner, solid laser oscillation is caused to occur.

Figure 4:
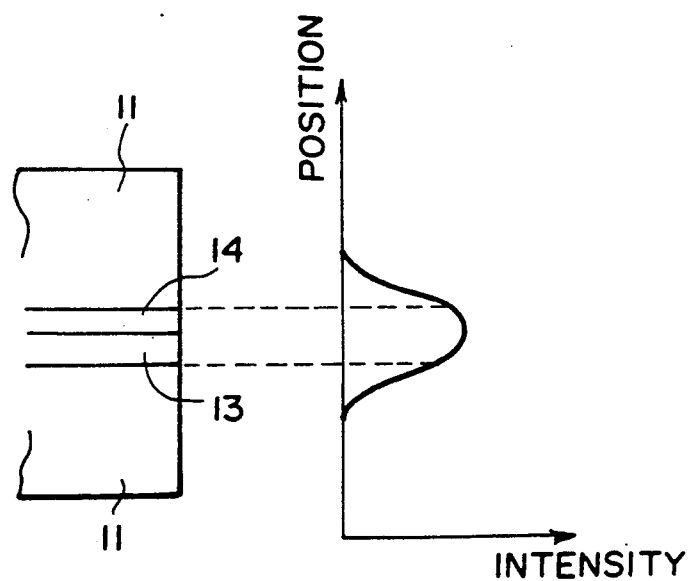
FIG. 4 is a diagram showing the intensity distribution of a fundamental wave in the embodiment of FIG. 1.

Basically, the intensity of the laser beam 16 is distributed in the pattern shown in FIG. 4. Specifically, the intensity distribution of the laser beam 16 extends to the DMNP layer 14. The laser beam 16, which travels in the DMNP layer 14, is converted by DMNP service as a nonlinear optical material into the second harmonic 17, the wavelength of which is ½ of the wavelength of the laser beam 16, i.e. is $\lambda 3 = 532$ nm.

Figure 5:
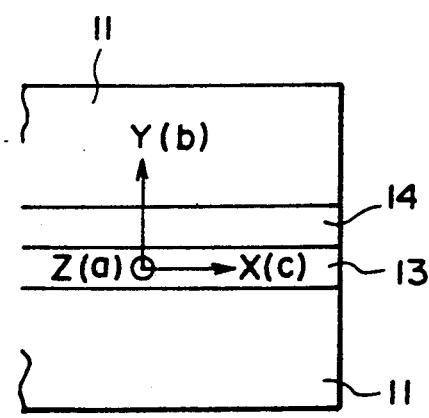
FIG. 5 is an explanatory view showing the crystal orientation of a nonlinear optical material employed in the embodiment of FIG. 1, and FIGS. 6 and 7 are schematic side views showing embodiments of the laser diode pumped solid laser in accordance with the present invention.

As illustrated in FIG. 5, when the DMNP layer 14 is formed in the manner described above, the DMNP crystal becomes orientated such that the a axis of the crystal (the Z optical axis) and the c axis of the crystal (the X optical axis) may directed in a direction, along which the DMNP layer 14 extends, and the b axis of the crystal (the Y optical axis) may be directed in a direction of the thickness of the DMNP layer 14. Therefore, by appropriately setting the direction, along which the laser beam 16 is linearly polarized with respect to the optical waveguide 12, the nonlinear optical constant d32 or d33 of DNMP can be utilized.

As disclosed in, for example, U.S. Pat. No. 4,909,595, the nonlinear optical constant d32 or d33 of DNMP takes a markedly large value. Therefore, in cases where the nonlinear optical constant d32 or d33 of DNMP can be utilized in the manner described above, a high wavelength conversion efficiency can be achieved. Also, as described above, the optical waveguide 12 can be made sufficiently long. Therefore, the length, over which the laser beam 16 and DMNP interact with each other, can be made sufficiently long. Additionally, by confining the laser beam 16 in the optical waveguide 12, the power density of the laser beam 16 can be kept sufficiently high. These features contribute to an even further improvement in the wavelength conversion efficiency. By way of example, with this embodiment, a wavelength conversion efficiency of 5% can be obtained when the power of the semiconductor laser 20 is 100 mW.

Phase matching between the laser beam 16, which serves as a fundamental wave, and the second harmonic 17 can be set to either one of the Cherenkov radiation mode and the guided-guided mode, depending on whether the refractive index of the substrates 11, 11 serving as the cladding means is utilized or the nonlinear optical constant d32 or d33 is utilized.

The second harmonic 17 is radiated out of the edge face 10b of the optical waveguide device 10, which edge face is coated with the aforesaid film. By way of example, the second harmonic 17 is then passed through a filter (not shown) for filtering out the pumping beam 15 and the laser beam 16, which are slightly radiated out of the optical waveguide device 10 together with the second harmonic 17. In this manner, only the second harmonic 17 is obtained.

In the aforesaid embodiment, the optical wavelength converting device in accordance with the present invention takes on the form of a two-dimensional optical waveguide device. Alternatively, the optical wavelength converting device in accordance with the present invention may be constituted as a three-dimensional optical waveguide device or an optical fiber device.

The optical wavelength converting device in accordance with the present invention may also be constituted such that the laser beam, which has been obtained from the solid laser oscillation, may be converted into its third harmonic. Alternatively, the laser beam, which has been obtained from the solid laser oscillation, may serve as one fundamental wave, the pumping beam or a different light beam may serve as the other fundamental wave, and the two fundamental waves may be converted into a wave having a frequency equal to the sum of or the difference between the frequencies of the two fundamental waves.

Embodiments of the laser diode pumped solid laser in accordance with the present invention will be described hereinbelow.

Figure 6:
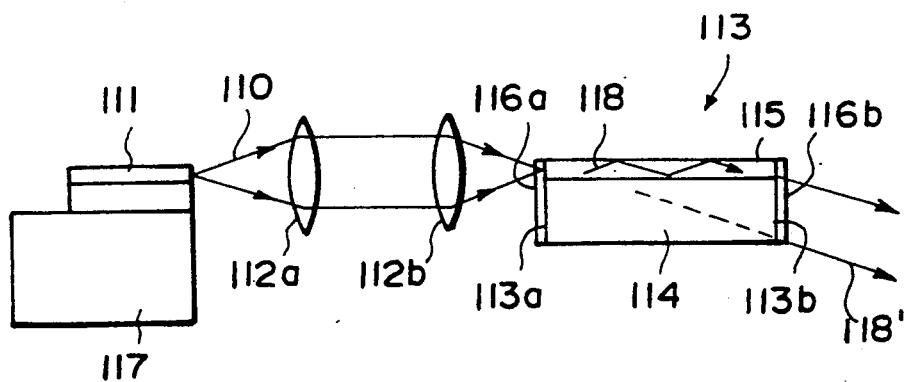

FIG. 6 shows a first embodiment of the laser diode pumped solid laser in accordance with the present invention.

With reference to FIG. 6, the laser diode pumped solid laser comprises a semiconductor laser 111 (a single longitudinal mode, single transverse mode laser, which will hereinafter be referred to as LD), which produces a laser beam 110 serving as a pumping beam. The laser diode pumped solid laser also comprises a collimator lens 112a for collimating the laser beam 110, which is divergent, a condensing lens 112b for condensing the laser beam 110, and an optical waveguide device 113.

The optical waveguide device 113 comprises a substrate 114 and three-dimensional optical waveguide 115. The substrate 114 is constituted of a single crystal of Nd:MgO:LiNbO3, which is one of self-frequency-doubling crystals. The three-dimensional optical waveguide 115 is formed of a material having a higher refractive index than the substrate 114 by a Ti diffusion process or an ion exchange process, such as a proton exchange process. Two edge faces 113a and 113b of the optical waveguide device 113 are planished and coated with films 116a and 116b, respectively, which have effects described later.

The aforesaid elements of the laser diode pumped solid laser are mounted on a common support. The temperature of the LD 111 is set at a predetermined value by a Peltier element 117 and a temperature control circuit (not shown).

The LD 111 produces the laser beam 110 having a wavelength of λ1=808 nm. The laser beam 110 is condensed by the lenses 112a and 112b and impinges upon one edge face of the three-dimensional optical waveguide 115. The laser beam 110 enters the optical waveguide 115 from its edge face and travels therein in a guided mode. The optical waveguide 115 has been doped with neodymium (Nd). Therefore, the Nd atoms in the optical waveguide 115 are stimulated by the laser beam 110 and produce a laser beam 118 having a wavelength of λ2=1,094 nm.

The films 116a and 116b constitute a resonator. Specifically, the film 116a is located on the side of the LD 111 and serves as an input side resonator mirror. The film 116a reflects the laser beam 118 having a wavelength of 1,094 nm (with a reflectivity of at least 99.9%) and transmits the pumping laser beam 110 having a wavelength of 808 nm (with a transmittance of at least 99%). The film 116b serves as an output side resonator mirror. The film 116b reflects the pumping laser beam 110 and the laser beam 118, which serves as a fundamental wave, (with a reflectivity of at least 99.9%) and transmits a second harmonic 118' having a wavelength of 547 nm, which will be described later. Therefore, the laser beam 118 having a wavelength of 1,094 nm is confined between the two edge faces 113a and 113b of the optical waveguide device 113, and laser oscillation is thereby caused to occur.

In the optical waveguide 115, which is constituted of a laser medium and has a function of converting a wavelength, the laser beam 118 is converted into the second harmonic 118', the wavelength of which is ½ of the wavelength of the laser beam 118, i.e. is 547 nm. Phase matching is achieved between a guided mode, in which the laser beam 118 serving as a fundamental wave is guided through the optical waveguide 115, and a radiation mode, in which the second harmonic 118' is radiated into the substrate 114 (i.e. the Cherenkov radiation). Because the output edge face 113b of the optical waveguide device 113 is coated with the film 116b, the second harmonic 118' is efficiently taken out of the optical waveguide device 113.

In this embodiment of the laser diode pumped solid laser in accordance with the present invention, when the output of the semiconductor laser beam 110 serving as a pumping beam is 100 mW, the output of the second harmonic 118' becomes approximately 1.0 mW. With this embodiment, optical loss in the resonator due to problems with regard to the aforesaid reflection, scattering, or the like, can be kept small, and wavelength conversion can be effected at a high efficiency.

In the aforesaid embodiment of the laser diode pumped solid laser in accordance with the present invention, the optical waveguide device 113 is of the Cherenkov radiation mode type. Alternatively, the laser diode pumped solid laser in accordance with the present invention may be constituted as a guided-guided mode type. Specifically, the second harmonic 118' may be caused to travel through the optical waveguide 115 in a guided mode, and phase matching may be achieved between the second harmonic 118' and the laser beam 118, which travels through the optical waveguide 115 in a guided mode.

In cases where the laser diode pumped solid laser in accordance with the present invention is constituted as the guided-guided mode type, the film 116a should preferably be formed of a material capable of reflecting the second harmonic 118' at a high reflectivity, and the film 116b should preferably be formed of a material for partially transmitting the second harmonic 118', such that the second harmonic 118' may resonate between the two edge faces 113a and 113b. In such cases, the second harmonic 118' having a higher intensity can be obtained.

Figure 7:
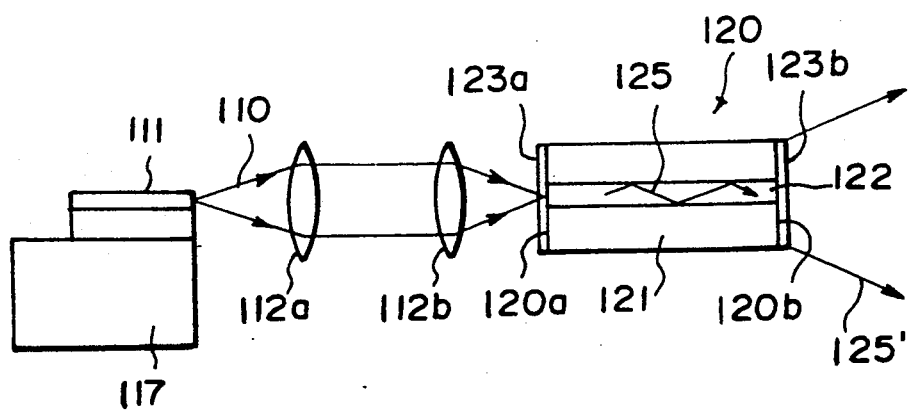

A second embodiment of the laser diode pumped solid laser in accordance with the present invention will be described hereinbelow with reference to FIG. 7. In FIG. 7, similar elements are numbered with the same reference numerals with respect to FIG. 6.

With reference to FIG. 7, a laser diode pumped solid laser comprises the LD 111, the collimator lens 112a, the condensing lens 112b, and an optical fiber 120. Two edge faces 120a and 120b of the optical fiber 120 are planished and coated with films 123a and 123b having effects, which will be described later.

The optical fiber 120 comprises a cladding 121, which is constituted of a hollow glass fiber, and a core 122, which is located in the cladding 121. The core 122 is constituted of Nd:COANP, which is one of the self-frequency-doubling crystals. The cladding 121 should preferably be formed of a heavy fling glass, such as SF10 glass, which has a lower refractive index than Nd:COANP. In order to fill and solidify the core material in the hollow glass fiber, the method as disclosed in, for example, Japanese Unexamined Patent Publication No. 1(1989)-23232 or U.S. Pat. No. 4,923,277 may be used.

The LD 111 produces the laser beam 110 having a wavelength of $\lambda 1 = 808$ nm. The laser beam 110 is condensed by the lenses 112a and 112b and impinges upon one edge face of the core 122. The laser beam 110 enters the core 122 from its edge face and travels therein in a guided mode. The core 122 has been doped with neodymium (Nd). Therefore, the Nd atoms in the core 122 are stimulated by the laser beam 110 and produce a laser beam 125 having a wavelength of $\lambda 2 = 1,064$ nm.

The films 123a and 123b constitute a resonator. Specifically, the film 123a is located on the side of the LD 111 and serves as an input side resonator mirror. The film 123a reflects the laser beam 125 having a wavelength of 1,064 nm (with a reflectivity of at least 99.9%) and transmits the pumping laser beam 110 having a wavelength 1 of 804 nm (with a transmittance of at least 99%). The film 123b reflects the pumping laser beam 110 and the laser beam 125, which serves as a fundamental wave, (with a reflectivity of at least 99%) and transmits a second harmonic 125' having a wavelength of 532 nm, which will be described later. Therefore, the laser beam 125 having a wavelength of 1,064 nm is confined between the two edge faces 120a and 120b of the optical fiber 120, and laser oscillation is thereby caused to occur.

In the core 122, which is constituted of a laser medium and has a function of converting a wavelength, the laser beam 125 is converted into the second harmonic 125', the wavelength of which is ½ of the wavelength of the laser beam 125, i.e. is 532 nm. Phase matching is achieved between a guided mode, in which the laser beam 125 serving as a fundamental wave is guided through the core 122, and a radiation mode, in which the second harmonic 125' is radiated into the cladding 121, (i.e. the Cherenkov radiation). Because the output edge face 120b of the optical fiber 120 is coated with the film 123b, the second harmonic 125' is efficiently taken out of the optical fiber 120.

In this embodiment of the laser diode pumped solid laser in accordance with the present invention, when the output of the semiconductor laser beam 110 serving as a pumping beam is 100 mW, the output of the second harmonic 125' becomes approximately 1.0 mW. With this embodiment, optical loss in the resonator due to problems with regard to the aforesaid refraction, scattering, or the like, can be kept small, and wavelength conversion can be effected at a high efficiency.

The optical fiber type of device may also be constituted as a guided-guided mode type.

In the two aforesaid embodiments of the laser diode pumped solid laser in accordance with the present invention, Nd:MgO:LiNbO$_3$ and Nd:COANP are used as the self-frequency-doubling crystals. However, no limitation is imposed on the kind of the self-frequency-doubling crystal. Any of other materials described above may be utilized for this purpose.

Also, in the two aforesaid embodiments of the laser diode pumped solid laser in accordance with the present invention, the laser beam, which has been obtained from the solid laser oscillation, is utilized as a fundamental wave, and its second harmonic is obtained. Alternatively, with the laser diode pumped solid laser in accordance with the present invention, the laser beam, which has been obtained from the solid laser oscillation, may be converted into its third harmonic. As another alternative, the pumping beam and the laser beam, which has been obtained from the solid laser oscillation, may be converted into a wave having a frequency equal to the sum of or the difference between the frequencies of the two beams. As a further alternative, a different laser beam, which is introduced into the waveguide means together with the pumping beam, and the laser beam, which has been obtained from the solid laser oscillation, may be converted into a wave having a frequency equal to the sum of or the difference between the frequencies of the two beams.

We claim:

1. An optical wavelength converting device, which comprises an optical waveguide device provided with:
   i) a waveguide means, which is constituted of a solid laser medium doped with a rare earth metal and a nonlinear optical material for converting a wavelength, said solid laser medium and said nonlinear optical material being overlaid one upon the other, and
   ii) a cladding means, which is formed of a material having a lower refractive index than said waveguide means and which accommodates said waveguide means therein,
      wherein two edge faces of said optical waveguide device serve as a resonator for a laser beam, which has been produced by said solid laser medium.

2. An optical wavelength converting device as defined in claim 1 wherein said rare earth metal is neodymium.

3. An optical wavelength converting device as defined in claim 1 wherein said nonlinear optical material is selected from organic nonlinear optical materials.

4. An optical wavelength converting device as defined in claim 1 wherein the laser beam, which has been obtained from solid laser oscillation and serves as a fundamental wave, is converted into its second harmonic.

5. An optical wavelength converting device as defined in claim 1 wherein the laser beam, which has been obtained from solid laser oscillation and serves as a fundamental wave, is converted into its third harmonic.

6. An optical wavelength converting device as defined in claim 1 wherein the laser beam, which has been obtained from solid laser oscillation and serves as a fundamental wave, and a pumping beam, which is introduced into said waveguide means, are converted into a wave having a frequency equal to the sum of or the difference between the frequencies of the two beams.

7. An optical wavelength converting device as defined in claim 1 wherein the laser beam, which has been obtained from solid laser oscillation and serves as a fundamental wave, and a different laser beam, which is introduced into said waveguide means together with a pumping beam, are converted into a wave having a frequency equal to the sum of or the difference between the frequencies of the two beams.

8. A laser diode pumped solid laser comprising:
   i) a waveguide means constituted of a solid laser medium, which has been doped with a rare earth metal and which has a function of converting a wavelength,
   ii) a cladding means, which is formed of a material having a lower refractive index than said waveguide means, and
   iii) resonator mirrors formed on two edge faces of said waveguide means such that a laser beam, which has been produced by said solid laser medium when said solid laser medium is pumped by a semiconductor laser beam incident upon said waveguide means, may oscillate between said resonator mirrors,
   whereby a wavelength-converted wave is obtained from the laser beam, and
   wherein the laser beam, which has been obtained from the oscillation and serves as a fundamental wave, is converted into its third harmonic.

9. A laser diode pumped solid laser comprising:
   i) a waveguide means constituted of a solid laser medium, which has been doped with a rare earth metal and which has a function of converting a wavelength,
   ii) a cladding means, which is formed of a material having a lower refractive index than said waveguide means, and
   iii) resonator mirrors formed on two edge faces of said waveguide means such that a laser beam, which has been produced by said solid laser medium when said solid laser medium is pumped by a semiconductor laser beam incident upon said waveguide means, may oscillate between said resonator mirrors,
   whereby a wavelength-converted wave is obtained from the laser beam, and
   wherein the laser beam, which has been obtained from the oscillation and serves as a fundamental wave, and the semiconductor laser beam, which serves as a pumping beam, are converted into a wave having a frequency equal to the sum of or the difference between the frequencies of the two beams.

10. A laser diode pumped solid laser comprising:
    i) a waveguide means constituted of a solid laser medium, which has been doped with a rare earth metal and which has a function of converting a wavelength,
    ii) a cladding means, which is formed of a material having a lower refractive index than said waveguide means, and
    iii) resonator mirrors formed on two edge faces of said waveguide means such that a laser beam, which has been produced by said solid laser medium when said solid laser medium is pumped by a semiconductor laser beam incident upon said waveguide means, may oscillate between said resonator mirrors,
    whereby a wavelength-converted wave is obtained from the laser beam, and
    wherein the laser beam, which has been obtained from the oscillation serves as a fundamental wave, and a different laser beam, and which is introduced into said waveguide means together with the semiconductor laser beam, are converted into a wave having a frequency equal to the sum of or the difference between the frequencies of the two beams.

* * * * *